(12) United States Patent
Cho

(10) Patent No.: US 12,548,476 B2
(45) Date of Patent: Feb. 10, 2026

(54) TAG FOR MARKING DEFECTIVE PART OF ELECTRODE FOR SECONDARY BATTERY AND MANUFACTURING METHOD THEREOF

(71) Applicant: Eun Mi Cho, Daegu (KR)

(72) Inventor: Eun Mi Cho, Daegu (KR)

( * ) Notice: Subject to any disclaimer, the term of this patent is extended or adjusted under 35 U.S.C. 154(b) by 281 days.

(21) Appl. No.: 18/271,863

(22) PCT Filed: Jan. 5, 2022

(86) PCT No.: PCT/KR2022/000155
§ 371 (c)(1),
(2) Date: Jul. 12, 2023

(87) PCT Pub. No.: WO2022/177148
PCT Pub. Date: Aug. 25, 2022

(65) Prior Publication Data
US 2024/0304115 A1    Sep. 12, 2024

(30) Foreign Application Priority Data

Feb. 22, 2021 (KR) .................. 10-2021-0023655

(51) Int. Cl.
*G09F 3/10* (2006.01)
*B32B 7/06* (2019.01)
(Continued)

(52) U.S. Cl.
CPC .................. *G09F 3/10* (2013.01); *B32B 7/06* (2013.01); *B32B 7/14* (2013.01); *B32B 27/10* (2013.01);
(Continued)

(58) Field of Classification Search
CPC .............. G09F 3/10; G09F 2003/0225; G09F 2003/0239; G09F 2003/0257
See application file for complete search history.

(56) References Cited

U.S. PATENT DOCUMENTS 6,210,524 B1 * 4/2001 Josephy .................. B32B 27/32
156/247
6,497,933 B1 * 12/2002 Yeager ..................... C09J 7/401
428/355 R (Continued)

FOREIGN PATENT DOCUMENTS

JP           6431902 B2      11/2018
KR      10-1330880 B1      11/2013

*Primary Examiner* — Gary C Hoge
(74) *Attorney, Agent, or Firm* — Quantum Patent Law Firm; Seongyoune Kang

(57) ABSTRACT

A tag for marking a defective portion of an electrode for a secondary battery and a manufacturing method thereof are provided. More specifically, the tag for marking a defective portion of an electrode is simply attached to a place recognized as having a defect in an electrode for a secondary battery produced by an automation process. So, the tag for marking a defective portion of an electrode for a secondary battery is formed as release paper applied with color contrasted with the color of the tag for marking is laminated so that a light sensor installed in an automatic tag feeder identifies the release paper and the tag for marking without an error to automatically supply the tag for marking when supplying the tag for marking a defective portion of an electrode by the automatic tag feeder.

10 Claims, 3 Drawing Sheets

(51) Int. Cl.
- *B32B 7/14* (2006.01)
- *B32B 27/10* (2006.01)
- *B32B 27/36* (2006.01)
- *B32B 37/24* (2006.01)
- *C09J 7/25* (2018.01)
- *C09J 7/38* (2018.01)
- *C09J 7/40* (2018.01)
- *G09F 3/02* (2006.01)
- *H01M 4/04* (2006.01)

(52) U.S. Cl.
CPC .............. *B32B 27/36* (2013.01); *B32B 37/24* (2013.01); *C09J 7/255* (2018.01); *C09J 7/385* (2018.01); *C09J 7/401* (2018.01); *C09J 7/403* (2018.01); *C09J 7/405* (2018.01); *B32B 2037/243* (2013.01); *B32B 2255/12* (2013.01); *B32B 2255/26* (2013.01); *B32B 2255/28* (2013.01); *B32B 2307/4023* (2013.01); *B32B 2307/412* (2013.01); *B32B 2307/7376* (2023.05); *B32B 2307/748* (2013.01); *B32B 2317/12* (2013.01); *B32B 2333/08* (2013.01); *B32B 2367/00* (2013.01); *B32B 2383/00* (2013.01); *B32B 2519/00* (2013.01); *C09J 2203/33* (2013.01); *C09J 2400/28* (2013.01); *C09J 2433/00* (2013.01); *C09J 2467/005* (2013.01); *C09J 2467/006* (2013.01); *C09J 2483/005* (2013.01); *G09F 2003/0225* (2013.01); *G09F 2003/0239* (2013.01); *G09F 2003/0257* (2013.01); *H01M 4/04* (2013.01)

(56) References Cited

U.S. PATENT DOCUMENTS

| | | | |
|---|---|---|---|
| 2012/0263905 A1* | 10/2012 | Park | C09J 7/21 427/160 |
| 2016/0200133 A1* | 7/2016 | Aigner | B32B 27/308 283/85 |
| 2017/0337851 A1* | 11/2017 | Guzzo | B44C 1/1737 |
| 2018/0147806 A1* | 5/2018 | Mitchell | B32B 27/08 |
| 2023/0146326 A1* | 5/2023 | Garza | G09F 3/0341 383/5 |
| 2024/0071260 A1* | 2/2024 | Cho | C09J 7/22 |
| 2025/0148939 A1* | 5/2025 | Wojtus | G09F 3/10 |

* cited by examiner

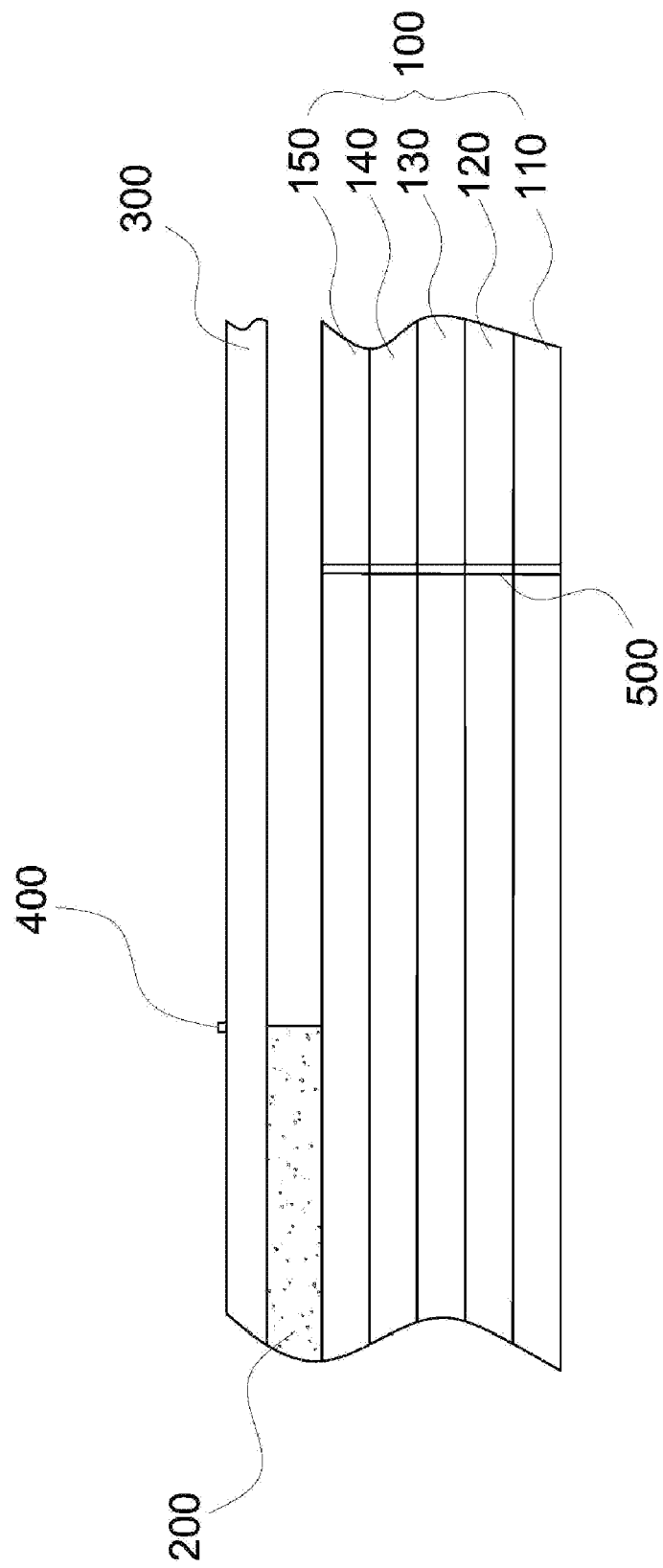

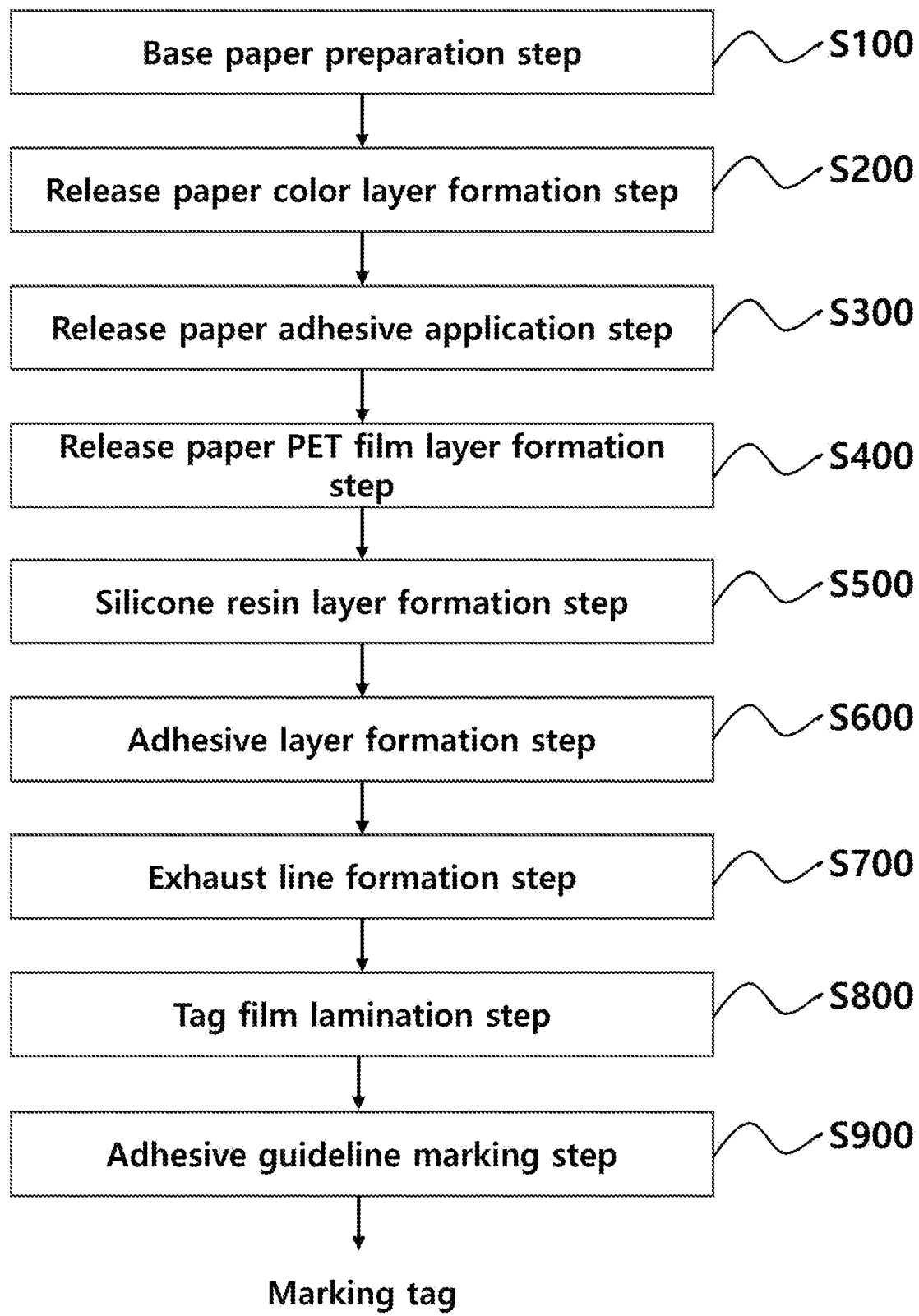

TAG FOR MARKING DEFECTIVE PART OF ELECTRODE FOR SECONDARY BATTERY AND MANUFACTURING METHOD THEREOF

CROSS-REFERENCE TO RELATED APPLICATIONS

This patent application is a U.S. national stage application of International Application No. PCT/KR2022/000155, filed Jan. 5, 2022 and the entire contents of which are incorporated herein by reference, which claims priority to KR 10-2021-0023655, filed Feb. 22, 2021 and the entire contents of which are incorporated herein by reference.

TECHNICAL FIELD

The present invention relates to a tag for marking a defective portion of an electrode for a secondary battery and a manufacturing method thereof, more particularly to a tag for marking a defective portion of an electrode for a secondary battery and a manufacturing method thereof, in which when the marking tag, which is simply attached to a portion recognized as a defect on an electrode for a secondary battery produced by an automated process to mark the defective portion of the electrode, is fed from an automatic tag feeder, a release paper coated with a color contrasted with the color of a tag film is laminated onto top of the tag film to allow the release paper and the tag film to be identified without errors by a light sensor installed on the automatic tag feeder, thereby automatically feeding the marking tag.

BACKGROUND ART

Generally, an active material, a conductive material, and a binder are coated onto a current collector that is a thin layer having a low thickness and then dried to manufacture an electrode for a secondary battery. In a process of manufacturing the electrode for the secondary battery to the shape of a foil, external impurities may be added when the active material is coated onto the surface of the current collector, thereby causing defects, and otherwise, the active material may not be coated uniformly onto the surface of the current collector, thereby causing the defects occurring from the electrode itself. After the electrode for the secondary battery has been manufactured, accordingly, it is wound onto a roll, and it is checked whether a defect on the entire surface of the electrode exists. If so, the defect is marked on the electrode, while the electrode is being unwound from the roll. Next, the electrode is wound onto another roll and thus packaged or transferred for cutting, so that the defect marked on the surface of the electrode is eliminated to permit only the normal portion of the electrode to be used.

As demands for the electrode for the secondary battery have been increased, further, an automated production process is introduced, and so as to easily mark a defective portion on the surface of the electrode for the secondary battery in the automated production process and to prevent new defects caused by an adhesive from occurring, an amount of adhesive and a position of adhesive are optimizedly adjusted in the Prior art patent 1 as suggested below as filed by the same applicant as the invention, which already discloses a label for identifying a defective portion of an electrode for a secondary battery that is capable of minimizing the possibility of a secondary damage or defect on the surface of the foil-shaped electrode for the secondary battery.

However, the label as disclosed in the Prior art patent 1 is complicated in a manufacturing process, has a high manufacturing cost, and is substantially thick, so that when it is considered that the disposable label is thrown away after marking the defective portion of the electrode for the secondary battery, there is a need to develop a tag for marking a defective portion of an electrode for a secondary battery that is simpler in configuration and lower-priced than the existing label, while still having the advantages of the existing label capable of preventing an adhesive from leaking.

Further, as the automated process for producing the electrode for the secondary battery is performed, recently, a device for feeding a label or tag attached to the electrode to identify a defect of the electrode has been automated. After one piece of label or tag fed automatically has been used by a user who checks an identified portion where the electrode has a defect, next label or tag is fed automatically, and generally, a light sensor for identifying the label or tag from a release paper is used. The electrode for the secondary battery is a dark color such as black, and the label or tag attached to the electrode having a defect among the electrodes produced to identify the defective portion of the electrode is desirably a bright color such as white. However, the label or tag having an adhesive layer formed on a portion thereof is attached to the release paper and thus fed, and in this case, the release paper generally has a blue or white color, so that undesirably, the light sensor mounted on the automatic label or tag feeder fails to identify the label or tag from the release paper, thereby having problems in the label or tag feeding process or causing the recognition error of the light sensor.

Accordingly, the release paper coated with a different color from the label (tag) is required, but since the existing release paper has a silicone resin coated thereonto, it is hard to coat a given color onto the release paper through post-processing. If a base paper used as the release paper is coated with a given color and then subjected to silicone coating immediately, the silicon coating is not achieved well, and otherwise, the color layer gets loose after the silicone coating, so that the color layer may be separated or peeled off. If it is desired to use the label or tag having a bright color such as white so as to identify the defective portion of the electrode for the secondary battery, there is a need to develop a release paper to which a given color is applied so that the light sensor installed on the automatic label (tag) feeder easily identifies the given color from the label (tag), and so as to allow the light sensor to distinguishedly identify the release paper and the label (tag), the label (tag) and the release paper have to be clearly different in color from each other.

PRIOR ART LITERATURE

Prior art patent 1: Korean Patent No. 10-1330880 (Nov. 12, 2013)

DISCLOSURE

Technical Problem

Accordingly, the present invention has been made in view of the above-mentioned problems occurring in the related art.

It is an object of the present invention to provide a tag for marking a defective portion of an electrode for a secondary battery and a manufacturing method thereof that are capable of allowing a release paper and a tag film to be clearly identified by a light sensor installed on an automatic tag feeder, while the tag used to identify the defective portion of the electrode for the secondary battery automatically produced through an automation production process is being automatically fed, thereby preventing a problem in which automatic tag feeding is not smoothly performed due to recognition errors of the light sensor from occurring.

It is another object of the present invention to provide a tag for marking a defective portion of an electrode for a secondary battery and a manufacturing method thereof that are capable of being simpler in configuration and easier in a manufacturing process than the existing identification label in such a way as to be easily used by a user and being lower in price than the existing identification label.

Technical Solution

To accomplish the above-mentioned objects, according to one aspect of the present invention, a tag for marking a defective portion of an electrode for a secondary battery, the tag including: a release paper having a base paper, a release paper color layer formed by coating a given color onto top of the base paper, a release paper adhesive layer formed by applying a transparent adhesive onto top of the release paper color layer, a release paper polyethylene terephthalate (PET) film layer formed by attaching a transparent release paper PET film onto top of the release paper color layer, and a silicone resin layer formed by applying a silicone resin onto top of the release paper PET film layer in such a way as to be laminated on top of one another sequentially; an adhesive layer formed by applying an acrylic adhesive onto a portion of top of the silicone resin layer of the release paper to a thickness of 5 to 30 µm; and a tag film integrally coupled to the adhesive layer in such a way as to attach the underside of one side corresponding to 25 to 50% of the entire area thereof onto the release paper, the tag film being made of a synthetic resin film with a different color contrasted with the given color of the release paper color layer.

In this case, desirably, the tag film may be made of PET and have a thickness of 25 to 50 µm. The electrode for the secondary battery is wound and kept in a state where the marking tag is attached to the defective portion of the electrode after the check for the defective portion of the electrode for the secondary battery has been performed, but even if the tag film made of the PET and having a relatively low thickness of 25 to 50 µm is pressurized together with the electrode due to the application of pressure and weight during the winding, it does not affect the electrode heavily.

Moreover, the release paper color layer may be a red or yellow color, and the tag film may be a white color, so that when a color sensor or light sensor such as an infrared sensor is used as a sensor for identifying the tag film and the release paper in an automatic tag feeder, the release paper color layer and the tag film have high identification rates, thereby causing no problem in the automatic tag feeding process.

Further, desirably, the release paper PET film may be made of a transparent film, and the release paper adhesive layer coated onto top of the release paper color layer may be made of a transparent adhesive to allow the release paper color layer coated onto the base paper to be effectively recognized by the sensor.

Moreover, desirably, the release paper adhesive layer of the release paper may have a thickness of 10 to 15 µm, and the release paper PET film layer may have a thickness of 16 to 25 µm, so that while the colors are effectively identified by the sensor, the marking tag may not be thick when it is wound and provided. Further, desirably, the base paper may be a thin gloss coated paper that has a size of 60/m² and is glossy on one side thereof.

The adhesive that forms the adhesive layer of the marking tag according to the present invention may be made of an acrylic resin. In this case, the acrylic resin may be removable or permanent. This is because the electrode having the defect to which the marking tag is attached is thrown away in a state where the marking tag is attached thereto, and accordingly, there is no need to necessarily use the acrylic removable resin. The acrylic resin is an adhesive made by means of polymerization of acrylic monomers and has acrylic polymers as a subject thereof. Desirably, acrylic acid ester, methacrylic acid ester, and the like are used as the acrylic resin. To ensure high adhesion to a wide surface and to prevent a secondary electrode defect from being made due to the leakage of the adhesive to the outside when the adhesive is attached to the electrode, the acrylic removable resin may be desirably adopted. An adhesion value as required in the present invention is in the range of 100 to 800 gr/25 mm when the attached product is removed at an angle of 90° from a measuring instrument and in the range of 100 to 1400 gr/25 mm when the attached product is removed at an angle of 180° from the measuring instrument.

The tag according to the present invention may further include one or more adhesive guidelines marked with solid lines or broken line on top of the tag film to identify the boundary of a portion where the adhesive layer is formed on the underside of the tag film.

The adhesive guidelines allow the user who checks whether the electrode has a defect to easily recognize the position of the adhesive formed on the underside of the tag film at the time when he or she attaches the marking tag to the defective portion of the electrode, thereby improving the conveniences of the user and permitting the attached tag to be easily identified by a sensor for recognizing whether the tag is attached.

The tag according to the present invention may further include an exhaust line formed by incising a portion where the adhesive layer does not exist on the release paper along a longitudinal direction of the release paper and thus marked with a solid line or broken line. Air enters an empty space in which the adhesive layer does not exist, and accordingly, when the marking tag to which the release paper is attached is wound and kept, the marking tag may be varied in thickness according to the existence and non-existence of the adhesive layer. The formation of the exhaust line enables the air filled into the empty space in which the adhesive layer does not exist to be exhausted to the outside to thus allow the marking tag to be constant in thickness.

To accomplish the above-mentioned objects, according to another aspect of the present invention, a method for manufacturing a tag for marking a defective portion of an electrode for a secondary battery, the method including the steps of: preparing a base paper used for a release paper; coating a given color onto top of the base paper and drying the coated color to form a release paper color layer; applying a transparent acrylic permanent adhesive onto top of the release paper color layer to form a release paper adhesive layer; attaching a transparent PET film onto top of the release paper color layer to form a release paper PET film layer; coating a silicone resin having a release function onto top of the release paper PET film layer and drying the coated silicone resin to form a silicone resin layer; applying an acrylic adhesive onto a portion of top of the silicone resin layer of the release paper to form an adhesive layer having a thickness of 5 to 30 μm; and coupling a tag film made of a synthetic resin film with a different color contrasted with the given color of the release paper color layer to the adhesive layer in such a way as to attach the underside of one side corresponding to 25 to 50% of the entire area thereof to the adhesive layer and thus laminating the tag film on top of the release paper. However, if the area of the adhesive layer is less than 25% of the entire area of the tag film on one side end of the tag film, the tag film may be easily detached from the release paper, and accordingly, a minimal area of the adhesive layer is restricted to 25% of the entire area of the tag film. Contrarily, if the area of the adhesive layer is greater than 50% of the entire area of the tag film, the adhesive layer is formed even on the underside of the entire area of the marking tag when the marking tag is attached to the surface of the electrode for the secondary battery, a damage may be applied to another non-defect of the electrode.

After the step of forming the adhesive layer, the method according to the present invention may further include the step of forming an exhaust line marked with a solid line or broken line by incising a portion where the adhesive layer does not exist on the release paper along a longitudinal direction of the release paper.

After the step of laminating the tag film on top of the release paper, the method according to the present invention may further include the step of forming one or more adhesive guidelines marked with solid lines or broken line on top of the tag film to identify the boundary of a portion where the adhesive layer is formed on the underside of the tag film.

Advantageous Effects of Invention

The marking tag according to the present invention is configured to have the release paper coated with a color contrasted with the white color of the tag film that is clearly identified by the light sensor, thereby providing visual conveniences and clear identification when the user makes use of the tag film with a bright color such as white in contrast to the black electrode and allowing the automatic tag feeder to obviously identify the tag film and the release paper to solve the problem in which automatic tag feeding is not smoothly performed due to recognition errors of the sensor.

Further, the marking tag according to the present invention is configured to have the adhesive guidelines formed thereon to allow the user to easily identify the position of the adhesive layer formed, thereby enhancing the conveniences of the user at the time when the marking tag is attached to the defective portion of the electrode.

Moreover, the method for manufacturing the marking tag according to the present invention is configured to have the marking tag simpler in configuration and lower-priced in a manufacturing cost than the existing identification label, while still having the advantages of the existing identification label, thereby enhancing the conveniences of the user, lowering the manufacturing cost, and improving the conveniences in the manufacturing process.

BRIEF DESCRIPTION OF DRAWINGS

FIG. 2 is a sectional view taken along the line A-A' of the marking tag according to the present invention.

FIG. 3 is a flowchart showing a method for manufacturing the marking tag according to the present invention.

EXPLANATIONS OF REFERENCE NUMERALS

Figure 1:
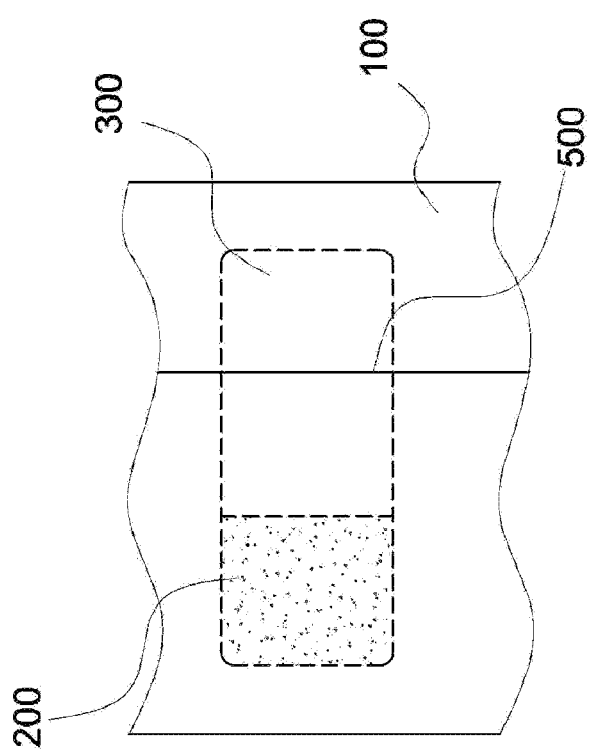
FIG. 1 shows top and underside of a marking tag according to the present invention.
Figure 1:
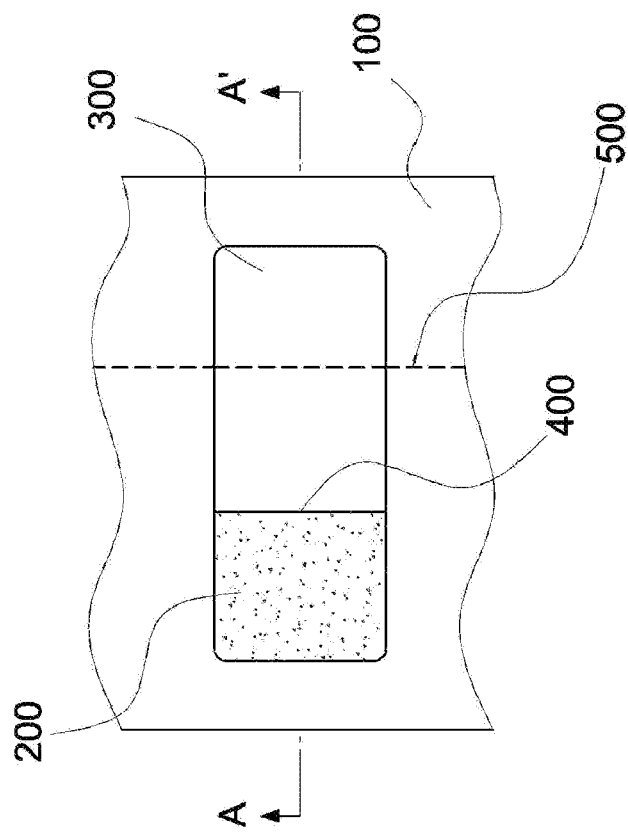

100: Release paper
110: Base paper 120: Release paper color layer
130: Release paper adhesive layer 140: Release paper PET film layer
150: Silicone resin layer
200: Adhesive layer
300: Tag film
400: Adhesive guideline
500: Exhaust line

MODE FOR INVENTION

Hereinafter, an embodiment of the present invention will be described with reference to the accompanying drawings.

FIG. 1 shows top and underside of a marking tag according to the present invention, and FIG. 2 is a sectional view taken along the line A-A' of the marking tag according to the present invention.

A left figure of FIG. 1 shows top of a marking tag according to the present invention, and a right figure thereof shows underside of the marking tag.

The marking tag according to the present invention largely includes a release paper 100, an adhesive layer 200, and a tag film 300. The solid lines of FIGS. 1 and 2 represent the parts seen from the outside, and the dotted lines thereof represent the parts existing on the underside of the marking tag according to the present invention.

The base paper constituting the release paper 100 is a coated one side paper that has a minimal thickness and a size of $60/m^2$, is a white color, and is glossy on one side thereof, so that the release paper is minimized in thickness, while having its original function. This is to prevent the release paper itself from being thick excessively when a release paper color layer 120 formed by coating a red or yellow color onto top of the base paper to optimize the color contrasted with the tag film 300, a release paper PET film layer 140 formed by attaching a transparent release paper PET film on top of the release paper color layer 120 using an acrylic permanent adhesive to fix the release paper color layer 120 thereto, and a silicone resin layer 150 are laminated on top of one another to form the release paper 100. In this case, desirably, the release paper color layer 120 has a thickness of 10 to 15 μm, and the release paper PET film layer 140 has a thickness of 16 to 19 μm. If a thick release paper is laminated on top of the tag film 300, the laminated material may not be wound in large amounts, and accordingly, the release paper has to be thin in thickness in such a way as to allow a sensor to obviously identify the release paper from the tag film 300. The silicone resin layer 150 is formed by applying a silicone resin onto top of the release paper PET film layer 140, thereby allowing the release paper 100 to have its release function.

The adhesive layer 200 is formed by applying an acrylic adhesive onto a portion of top of the silicone resin layer 150 of the release paper 100 and desirably has a thickness of 5 to 30 μm. According to the present invention, an acrylic removable adhesive is adopted to form the adhesive layer 200. The adhesive layer 200 is attachedly coupled to one side of the underside of the tag film 300 corresponding to about 25 to 30% of the entire area of the tag film 300, which is shown in FIG. 1. In this case, desirably, a PET film, which becomes thin to the thickness of 25 to 30 μm, is adopted as the tag film 300, and according to the present invention, the PET film with a white color is used as the tag film 300.

Further, at least one or more adhesive guidelines 400 are desirably marked with solid lines or broken lines on a portion of top of the tag film 300 where the adhesive layer 200 is formed on the underside of the tag film 300 or around the portion so as to notify the user of a given attachment margin needed when the marking tag is attached onto the electrode or help appropriate tagging. In FIGS. 1 and 2, one adhesive guideline 400 is marked with the solid line along a boundary line between the adhesive layer 200 and the tag film 300. Even though in specific not shown, in this case, two or more adhesive guidelines 400 may be marked for the conveniences of the user.

Moreover, an exhaust line 500 is additionally marked with a solid line or broken line by incising a portion where the adhesive layer 200 does not exist on the release paper 100 along a longitudinal direction of the release paper 100. Through the exhaust line 500, air existing in the space between the tag film 300 and the release paper 100 in a state where the tag film 300 is laminated on top of the release paper 100 is exhausted to the outside of the release paper 100, thereby preventing the marking tag from being irregularly wound when the marking tag is wound, keeping the tag film 300 from getting loose, and suppressing the thickness of the marking tag wound from increasing.

FIG. 3 is a flowchart showing a method for manufacturing the marking tag according to the present invention.

A base paper preparation step S100 is a step in which a base paper for a release paper is prepared. According to the present invention, desirably, the base paper is a coated one side paper that has a minimal thickness and a size of 60/m$^2$, is a white color, and is glossy on one side thereof.

A release paper color layer formation step S200 is a step in which a given color is coated onto the underside of the base paper and dried to form a release paper color layer. A red or yellow color is adopted as a color of the release paper color layer.

A release paper adhesive application step S300 is a step in which a transparent acrylic permanent adhesive is applied onto top of the release paper color layer to form a release paper adhesive layer. To allow the release paper color layer to have its original function as the release paper, without any separation or peeling, the release paper adhesive layer is provided, and as the release paper adhesive layer is formed, further, the release paper PET film layer as will be discussed later is attached well thereto so that when a silicone resin is coated, a silicone resin layer as will be discussed later is formed well.

After the release paper adhesive has been applied, a release paper PET film layer formation step S400 is carried out to attach the release paper PET film to top of the release paper adhesive layer.

After that, a silicone resin layer formation step S500 is carried out to coat the silicone resin serving to perform release onto top of the release paper PET film, dry the coated silicone resin, and thus form the silicone resin layer.

Through the above-mentioned steps, the release paper having the given color as one of the parts of the present invention is manufactured.

After the release paper has been manufactured, further, an adhesive layer formation step S600 is carried out to apply an acrylic removable adhesive onto a portion of top of the silicone resin layer and thus form an adhesive layer having a thickness of 5 to 30 μm.

After the adhesive layer formation step S600, if necessary, an exhaust line formation step S700 is carried out to form an exhaust line marked with a solid line or broken line by incising a portion where the adhesive layer does not exist on the release paper along a longitudinal direction of the release paper.

After that, a tag film lamination step S800 is carried out to attach a tag film made of a synthetic resin and having a different color contrasted with the color of the release paper color layer to the adhesive layer, while one side of the underside of the tag film corresponding to about 25 to 30% of the entire area of the tag film is attached to the adhesive layer, and to laminate the tag film on top of the release paper, thereby manufacturing the marking tag according to the present invention.

After the tag film lamination step S800, further, an adhesive guideline marking step S900 is carried out to form an adhesive guideline marked with a solid line or broken line on a portion of top of the tag film where the adhesive layer is formed on the underside of the tag film, so that the boundary of the portion is identified by the user to improve the conveniences of the user.

The invention claimed is:

1. A tag for marking a defective portion of an electrode for a secondary battery, the tag comprising:
    a release paper comprising:
        a base paper,
        a release paper color layer formed by coating a given color on top of the base paper,
        a release paper adhesive layer formed by applying a transparent adhesive onto top of the release paper color layer,
        a release paper polyethylene terephthalate (PET) film layer formed by attaching a transparent release paper PET film on top of the release paper color layer, and
        a silicone resin layer formed by applying a silicone resin on top of the release paper PET film layer in such a way as to be laminated on top of one another sequentially;
    an adhesive layer formed by applying an acrylic adhesive onto a portion of a top of the silicone resin layer of the release paper to a thickness of 5 to 30 μm; and
    a tag film integrally coupled to the adhesive layer in such a way as to attach an underside of one side corresponding to 25 to 50% of an entire area thereof onto the release paper, the tag film being made of a synthetic resin film with a different color contrasted with a given color of the release paper color layer.

2. The tag according to claim 1, wherein the tag film is made of polyethylene terephthalate (PET).

3. The tag according to claim 1, wherein the release paper color layer is a red or yellow color, and the tag film is a white color.

4. The tag according to claim 1, wherein the release paper adhesive layer is made of an acrylic permanent adhesive.

5. The tag according to claim 1, wherein the release paper adhesive layer has a thickness of 10 to 15 μm, the release paper PET film layer has a thickness of 16 to 25 μm, and the tag film has a thickness of 25 to 50 μm.

6. The tag according to claim 1, further comprising one or more adhesive guidelines marked with solid lines or broken line on top of the tag film to identify the boundary of a portion where the adhesive layer is formed on the underside of the tag film.

7. The tag according to claim 1, further comprising an exhaust line marked with a solid line or broken line by incising a portion where the adhesive layer does not exist on the release paper along a longitudinal direction of the release paper.

8. A method for manufacturing a tag for marking a defective portion of an electrode for a secondary battery, the method comprising the steps of:

preparing a base paper used for a release paper;

coating a given color onto top of the base paper and drying the coated color to form a release paper color layer;

applying a transparent acrylic permanent adhesive onto top of the release paper color layer to form a release paper adhesive layer;

attaching a transparent PET film onto top of the release paper color layer to form a release paper PET film layer;

coating a silicone resin having a release function onto top of the release paper PET film layer and drying the coated silicone resin to form a silicone resin layer;

applying an acrylic adhesive onto a portion of top of the silicone resin layer of the release paper to form an adhesive layer having a thickness of 5 to 30 μm; and coupling a tag film made of a synthetic resin film with a different color contrasted with the given color of the release paper color layer to the adhesive layer in such a way as to attach the underside of one side corresponding to 25 to 50% of the entire area thereof to the adhesive layer and thus laminating the tag film on top of the release paper.

9. The method according to claim 8, after the step of forming the adhesive layer, further comprising the step of forming an exhaust line marked with a solid line or broken line by incising a portion where the adhesive layer does not exist on the release paper along a longitudinal direction of the release paper.

10. The method according to claim 8, after the step of laminating the tag film to the release paper, further comprising the step of forming one or more adhesive guidelines marked with solid lines or broken line on top of the tag film to identify the boundary of a portion where the adhesive layer is formed on the underside of the tag film.

* * * * *